(12) United States Patent
Matsumoto et al.

(10) Patent No.: US 11,104,254 B2
(45) Date of Patent: Aug. 31, 2021

(54) CONSOLE SUPPORT STRUCTURE

(71) Applicant: KABUSHIKI KAISHA TOYOTA JIDOSHOKKI, Kariya (JP)

(72) Inventors: Yusuke Matsumoto, Kariya (JP); Hidenori Uno, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/835,659

(22) Filed: Mar. 31, 2020

(65) Prior Publication Data

US 2020/0317101 A1 Oct. 8, 2020

(30) Foreign Application Priority Data

Apr. 4, 2019 (JP) .............................. JP2019-072176

(51) Int. Cl.
*B60N 2/75* (2018.01)
*B60R 7/04* (2006.01)
*B60R 11/00* (2006.01)

(52) U.S. Cl.
CPC ............... *B60N 2/793* (2018.02); *B60N 2/78* (2018.02); *B60R 7/04* (2013.01); *B60R 2011/0007* (2013.01)

(58) Field of Classification Search
CPC ... B60N 2/793; B60N 2/78; B60R 2011/0007; B60R 7/04
USPC ...................................................... 296/24.34
See application file for complete search history.

(56) References Cited

U.S. PATENT DOCUMENTS

| 4,061,258 | A | * | 12/1977 | Dysart | .................... | B60R 11/02 |
| | | | | | | 224/540 |
| 10,981,513 | B2 | * | 4/2021 | Kawai | ....................... | B60R 7/04 |
| 2011/0088960 | A1 | * | 4/2011 | Hisazumi | ............... | B62D 21/15 |
| | | | | | | 180/271 |
| 2012/0292947 | A1 | | 11/2012 | Yamada et al. | | |
| 2017/0210314 | A1 | * | 7/2017 | Inagaki | ..................... | B60R 7/04 |
| 2019/0366936 | A1 | * | 12/2019 | Kawai | ....................... | B60R 7/04 |

FOREIGN PATENT DOCUMENTS

JP         2014-104940 A      6/2014

* cited by examiner

*Primary Examiner* — Jason S Morrow
(74) *Attorney, Agent, or Firm* — Sughrue Mion, PLLC

(57) ABSTRACT

A console support device comprises a first bracket including a placement portion on which a console box is placed; and a second bracket fixed to the first bracket. The second bracket includes a joint portion joined to a lower surface of the placement portion, an inclined portion provided to obliquely bend downward from a rear end of the joint portion, and a base portion provided to bend from a lower end of the inclined portion. A cantilever region which is supported on the joint portion in a cantilever manner is provided on a rear end side of the placement portion. A connection part between the joint portion and the inclined portion forms a first bend portion. A connection part between the inclined portion and the base portion forms a second bend portion.

7 Claims, 5 Drawing Sheets

CONSOLE SUPPORT STRUCTURE

TECHNICAL FIELD

The present disclosure relates to a console support structure.

BACKGROUND

As a console support structure in the related art, for example, there is known a technique in Japanese Unexamined Patent Publication No. 2014-104940. In the console support structure disclosed in Japanese Unexamined Patent Publication No. 2014-104940, a console box is supported on a floor of a vehicle body via a bracket. The bracket includes a pair of leg portions; a top wall portion that is provided in upper end portions of the pair of leg portions to span between the leg portions; an extension portion that extends from a rear end of the top wall portion toward a rear side of a vehicle; and a side wall portion that connects rear ends of the leg portions to outside ends of the extension portion in a vehicle width direction. When an impact load is input to the console box from an upper side of the vehicle and is transmitted to the bracket, the extension portion is flexed toward a lower side of the vehicle and the side wall portion is flexed. Therefore, the energy of the impact is absorbed.

SUMMARY in the related art described above, when an impact load is input to the bracket from above the vehicle via the console box, the extension portion is bent downward from a connection part between the top wall portion and the extension portion, and is flexed. However, since the bracket includes only one bend portion, it is difficult to smoothly deform the bracket.

An object of the present disclosure is to provide a console support structure in which a bracket can be smoothly deformed when an impact load is input from above a vehicle.

According to one aspect of the present disclosure, there is provided a console support structure that is disposed in a central portion of a vehicle in a vehicle width direction to support a console box, the structure comprising a first bracket including a placement portion on which the console box is placed; and a second bracket fixed to the first bracket. The second bracket includes a joint portion joined to a lower surface of the placement portion, an inclined portion provided to obliquely bend downward from one end of front and rear ends of the joint portion, and a base portion provided to bend from a lower end of the inclined portion. A cantilever region which is supported on the joint portion in a cantilever manner is provided on one end side of the front and rear ends of the placement portion. A connection part between the joint portion and the inclined portion forms a first bend portion. A connection part between the inclined portion and the base portion forms a second bend portion.

In this console support structure, when an impact load is input to the console box from above the vehicle, firstly, the cantilever region of the placement portion of the first bracket, the cantilever region being supported on the joint portion of the second bracket in a cantilever manner, is bent and deformed. Then, when the deformation of the cantilever region is transmitted to the second bracket, the joint portion and the inclined portion are bent from the first bend portion, and the inclined portion and the base portion are bent from the second bend portion. Thus the second bracket is deformed. As described above, since the second bracket is provided with two bend portions which are the first bend portion and the second bend portion, the first bracket and the second bracket can be smoothly deformed when an impact load is input from above the vehicle.

The second bracket may be disposed behind the first bracket, the inclined portion may be provided to obliquely bend rearward and downward from a rear end of the joint portion, and the cantilever region may be provided on a rear end side of the placement portion. In this configuration, it is possible to absorb and reduce an impact induced when a part of the body of an occupant in a rear seat comes into contact with the console box.

A fragile portion having a weaker strength than those of other regions of the placement portion may be provided in a base end portion of the cantilever region. In this configuration, when an impact load is input to the console box from above the vehicle, the cantilever region is easily bent. Therefore, the first bracket and the second bracket can be more smoothly deformed.

The fragile portion may include a long hole extending in the vehicle width direction. In this configuration, it is possible to easily form the fragile portion.

A first flange portion with an L-shaped cross section which extends from a rear end of the placement portion in a forward and rearward direction of the vehicle and a second flange portion with an L-shaped cross section which extends from a front end of the placement portion in the forward and rearward direction of the vehicle may be respectively provided at both side edges of the placement portion in the vehicle width direction, and the fragile portion may include a recess portion that is disposed between the first flange portion and the second flange portion. In this configuration, it is possible to form the fragile portion while increasing the rigidity of the placement portion.

The first bracket may include a first leg portion that is provided to bend downward from the other end of the front and rear ends of the placement portion, and the base portion may include a second leg portion that is provided to bend downward from the lower end of the inclined portion. In this configuration, since the second leg portion bends downward from the lower end of the inclined portion, the inclined portion and the second leg portion are easily bent from the second bend portion. Since the first leg portion is provided in the first bracket and the second leg portion is provided in the second bracket, the console support structure is easily mounted on a floor in a passenger compartment.

The first leg portion and the second leg portion may be coupled to each other by a coupling member. In this configuration, the rigidity of the console support structure is increased.

According to the present disclosure, when an impact load is input from above the vehicle, the bracket can be smoothly deformed.

DETAILED DESCRIPTION

Figure 1:
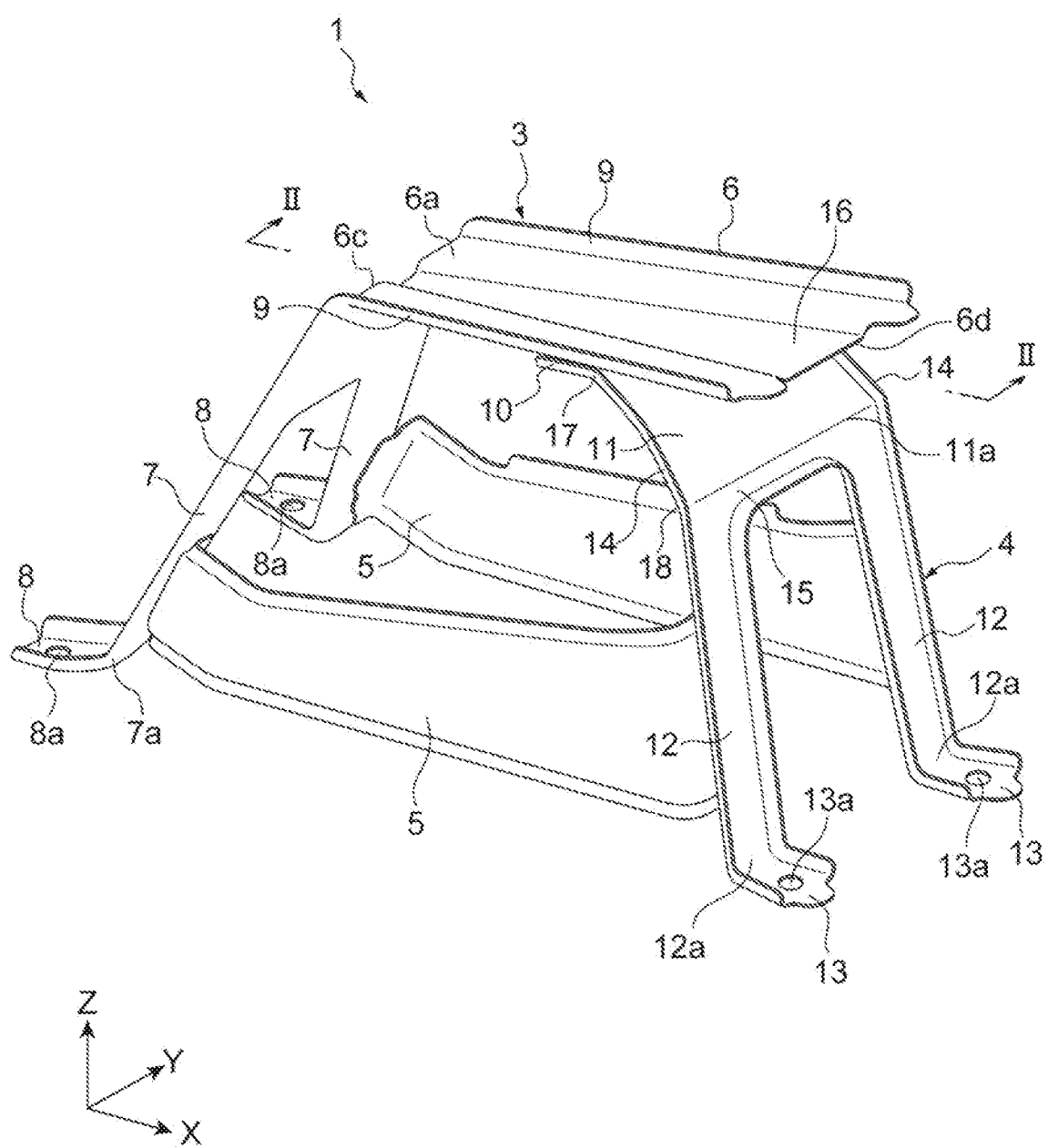
FIG. 1 is a perspective view illustrating the outward appearance of a console support structure according to one embodiment.

Hereinbelow, an embodiment of the present disclosure will be described in detail with reference to the drawings. In the drawings, the same reference signs will be assigned to the same or equivalent elements, and duplicated descriptions will be omitted.

Figure 2:
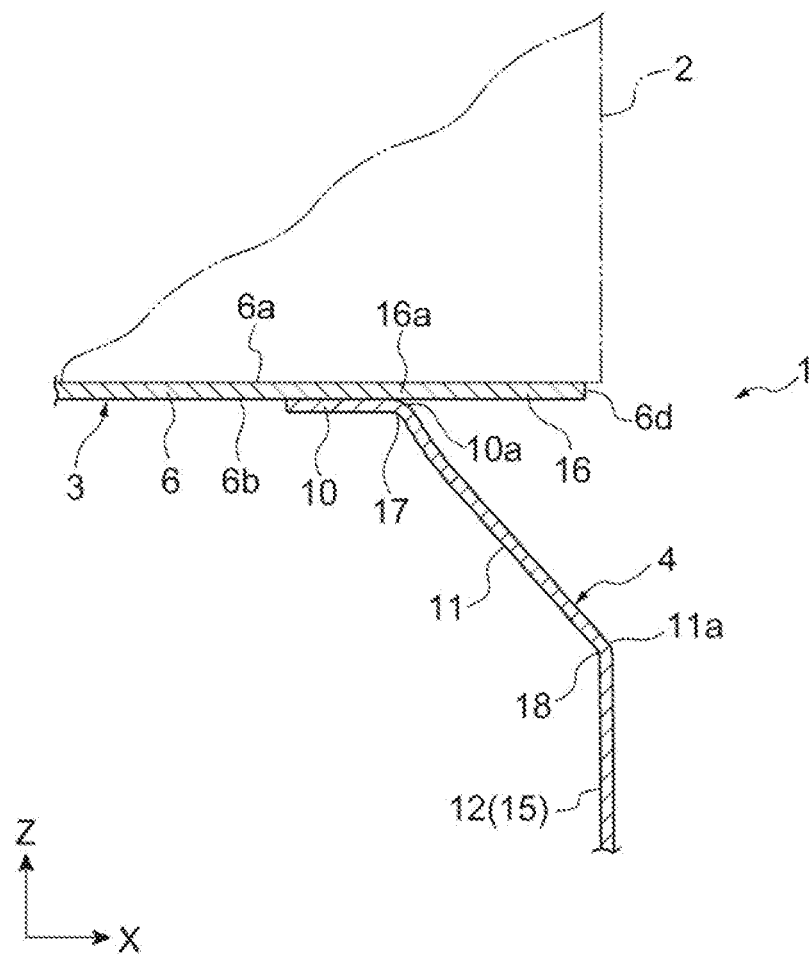
FIG. 2 is a partial cross-sectional view of the console support structure illustrated in FIG. 1.

FIG. 1 is a schematic perspective view illustrating the outward appearance of a console support structure according to one embodiment. FIG. 2 is a partial cross-sectional view of the console support structure illustrated in FIG. 1. FIG. 2 is a cross-sectional view taken along a line II-II in FIG. 1.

In FIGS. 1 and 2, a console support device 1 which is the console support structure of this embodiment is disposed in a central portion of a vehicle in a vehicle width direction (Y direction) to support a console box 2. The console support device 1 is mounted on a floor in a passenger compartment between a driver's seat and a passenger's seat.

The console support device 1 comprises a first bracket 3; a second bracket 4 fixed to the first bracket 3; and two coupling members 5 that couple the first bracket 3 to the second bracket 4. The first bracket 3, the second bracket 4, and the coupling members 5 are made of a metallic sheet such as an iron sheet or a stainless steel sheet. The console box 2 is made of resin.

The first bracket 3 includes a placement portion 6; two front leg portions 7 (first leg portions) connected to the placement portion 6; and two mounting portions 8 respectively connected to the two front leg portions 7. Protrusion walls 9 are provided at both side edges of the first bracket 3 in the vehicle width direction.

The placement portion 6 extends in a forward and rearward direction (X direction) of the vehicle. The placement portion 6 includes an upper surface 6a which is a placement surface on which the console box 2 is placed, and a lower surface 6b which is a surface opposite to the placement surface. The front leg portion 7 is provided to bend downward from a front end 6c of the placement portion 6. The front leg portion 7 extends in an upward and downward direction (Z direction) of the vehicle. The mounting portion 8 is provided to bend forward from a lower end 7a of the front leg portion 7. A mounting hole 8a through which a fastening screw (not illustrated) passes is provided in the mounting portion 8.

The second bracket 4 is disposed behind the first bracket 3. The second bracket 4 includes a joint portion 10 joined to the lower surface 6b of the placement portion 6; an inclined portion 11 connected to the joint portion 10; two rear leg portions 12 (second leg portions) connected to the inclined portion 11; and two mounting portions 13 respectively connected to the two rear leg portions 12. Protrusion walls 14 are respectively provided at both side edges of the second bracket 4 in the vehicle width direction. The width dimensions of the joint portion 10 and the inclined portion 11 are larger than the width dimension of the placement portion 6.

The joint portion 10 is joined to the lower surface 6b of the placement portion 6 by welding. For example, the joint portion 10 is joined to a central portion of the lower surface 6b of the placement portion 6 in the forward and rearward direction of the vehicle. The inclined portion 11 is provided to obliquely bend rearward and downward from a rear end 10a of the joint portion 10. The rear end 10a of the joint portion 10 is one end of front and rear ends of the joint portion 10. The inclined portion 11 is inclined at a predetermined angle (for example, 45 degrees) with respect to the joint portion 10.

The rear leg portion 12 is provided to bend downward from a lower end 11a of the inclined portion 11. The rear leg portion 12 extends in the upward and downward direction of the vehicle. The mounting portion 13 is provided to bend rearward from a lower end 12a of the rear leg portion 12. A mounting hole 13a through which a fastening screw (not illustrated) passes is provided in the mounting portion 13. The rear leg portion 12 and the mounting portion 13 form a base portion 15 that is provided to bend from the lower end 11a of the inclined portion 11.

A cantilever region 16 which is supported on the joint portion 10 in a cantilever manner is provided on a rear end 6d side of the placement portion 6 of the first bracket 3. The rear end 6d of the placement portion 6 is one end of front and rear ends of the placement portion 6. The front end 6c of the placement portion 6 is the other end of the front and rear ends of the placement portion 6. A base end 16a of the cantilever region 16 is a position corresponding to the position of the rear end 10a of the joint portion 10. In the cantilever region 16, a distance between the placement portion 6 and the inclined portion 11 increases gradually toward the rear end 6d side of the placement portion 6.

In the second bracket 4, a connection part between the joint portion 10 and the inclined portion 11 forms a first bend portion 17 with a structure where the inclined portion 11 is bent with respect to the joint portion 10. In the second bracket 4, a connection part between the inclined portion 11 and the base portion 15 forms a second bend portion 18 with a structure where the base portion 15 is bent with respect to the inclined portion 11.

The coupling members 5 couple the front leg portions 7 of the first bracket 3 to the rear leg portions 12 of the second bracket 4. The coupling members 5 extend in the forward and rearward direction (X direction) of the vehicle.

Figure 3A:
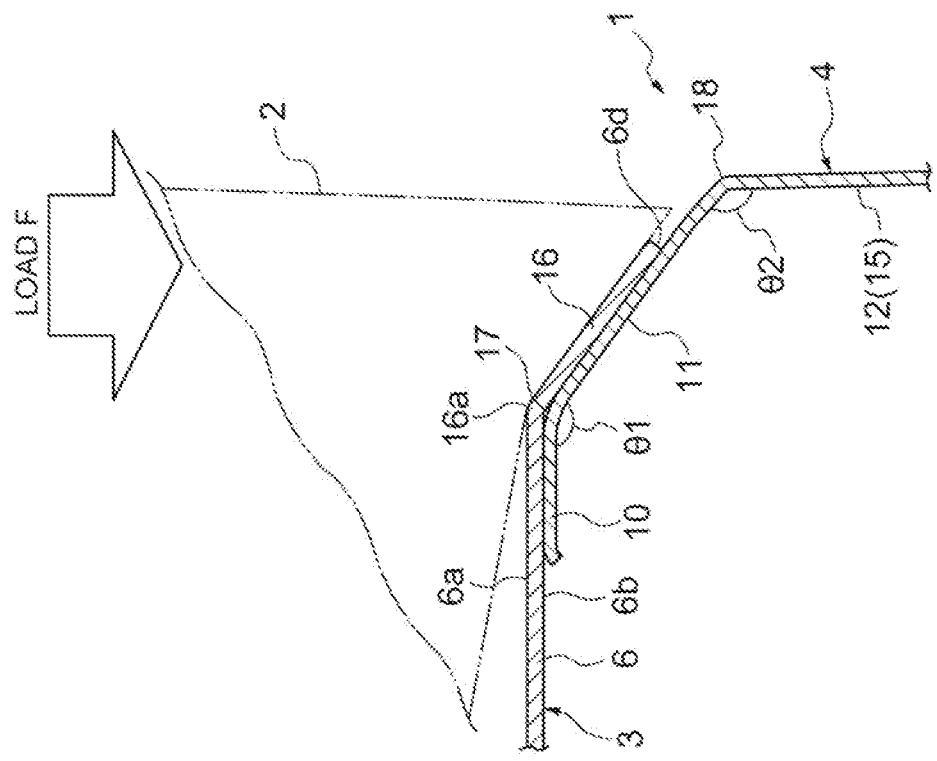
FIGS. 3A and 3B are partial cross-sectional views illustrating a manner where the console support structure illustrated in FIG. 1 absorbs an impact load from above a vehicle.
Figure 3B:
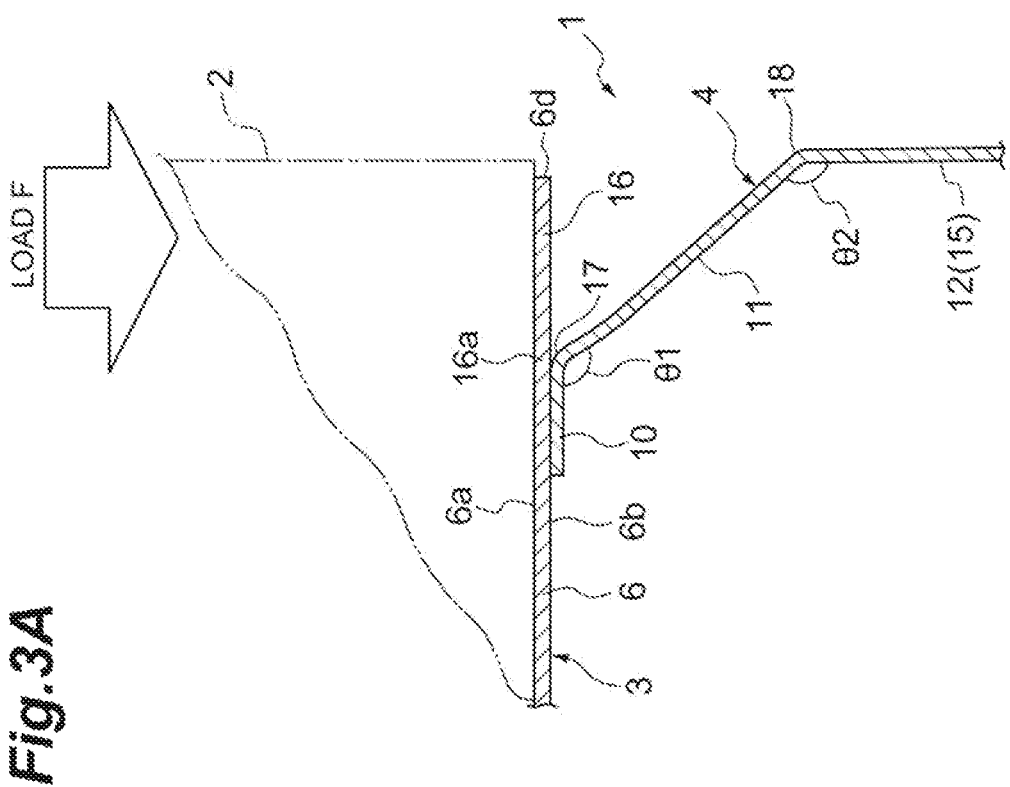

In the above configuration, as illustrated in. FIGS. 3A and 3B, when an impact load F is input to the console box 2 from above the vehicle at the time of collision or the like, the impact load F transmitted to the console support device 1 via the console box 2. Then, the console box 2 is pressed downward; and thereby, the cantilever region 16 of the placement portion 6 of the first bracket 3 is bent downward from the base end 16a of the cantilever region 16 and is deformed in a buckling manner.

The buckling deformation of the first bracket 3 is transmitted to the second bracket 4, and the second bracket 4 is pressed downward; and thereby, the joint portion 10, the inclined portion 11, and the base portion 15 are bent and deformed in a buckling manner.

Specifically, since the second bracket 4 is pressed downward, the joint portion 10 and the inclined portion 11 are deformed in a buckling manner from the first bend portion 17 to separate each other. Namely, since the joint portion 10 and the inclined portion 11 are deformed from the first bend portion 17, an angle θ1 formed between the joint portion 10 and the inclined portion 11 is increased.

Since the placement portion 6 comes into contact with the inclined portion 11 and the inclined portion 11 is pressed downward, the inclined portion 11 and the base portion 15 are deformed in a buckling manner from the second bend portion 18 to approach each other. Namely, since the inclined portion 11 and the base portion 15 are deformed from the second bend portion 18, an angle θ2 formed between the inclined portion 11 and the base portion 15 is decreased. As described above, the impact load F from above the vehicle is absorbed.

In this embodiment described above, when an impact load is input to the console box 2 from above the vehicle, firstly, the cantilever region 16 of the placement portion 6 of the first bracket 3, the cantilever region 16 being supported on the joint portion 10 of the second bracket 4 in a cantilever manner, is bent and deformed. Then, when the deformation of the cantilever region 16 is transmitted to the second bracket 4, the joint portion 10 and the inclined portion 11 are bent from the first bend portion 17, and the inclined portion 11 and the base portion 15 are bent from the second bend portion 18. Thus the second bracket 4 is deformed. As described above, since the second bracket 4 is provided with two bend portions which are the first bend portion 17 and the second bend portion 18, the first bracket 3 and the second bracket 4 can be smoothly deformed when an impact load is input from above the vehicle. Therefore, it is possible to effectively absorb the impact applied to the console support device 1.

In this embodiment, since the second bracket 4 is disposed behind the first bracket 3, it is possible to absorb and reduce an impact induced when a part of the body of an occupant in a rear seat comes into contact with the console box 2.

In this embodiment, since the rear leg portions 12 of the second bracket 4 bend downward from the lower end 11a of the inclined portion 11, the inclined portion 11 and the rear leg portions 12 are easily bent from the second bend portion 18. Since the front leg portions 7 are provided in the first bracket 3 and the rear leg portions 12 are provided in the second bracket 4, the console support device 1 is easily mounted on the floor in the passenger compartment.

In this embodiment, since the front leg portions 7 and the rear leg portions 12 are coupled to each other by the coupling members 5, the rigidity of the console support device 1 is increased.

Figure 4:
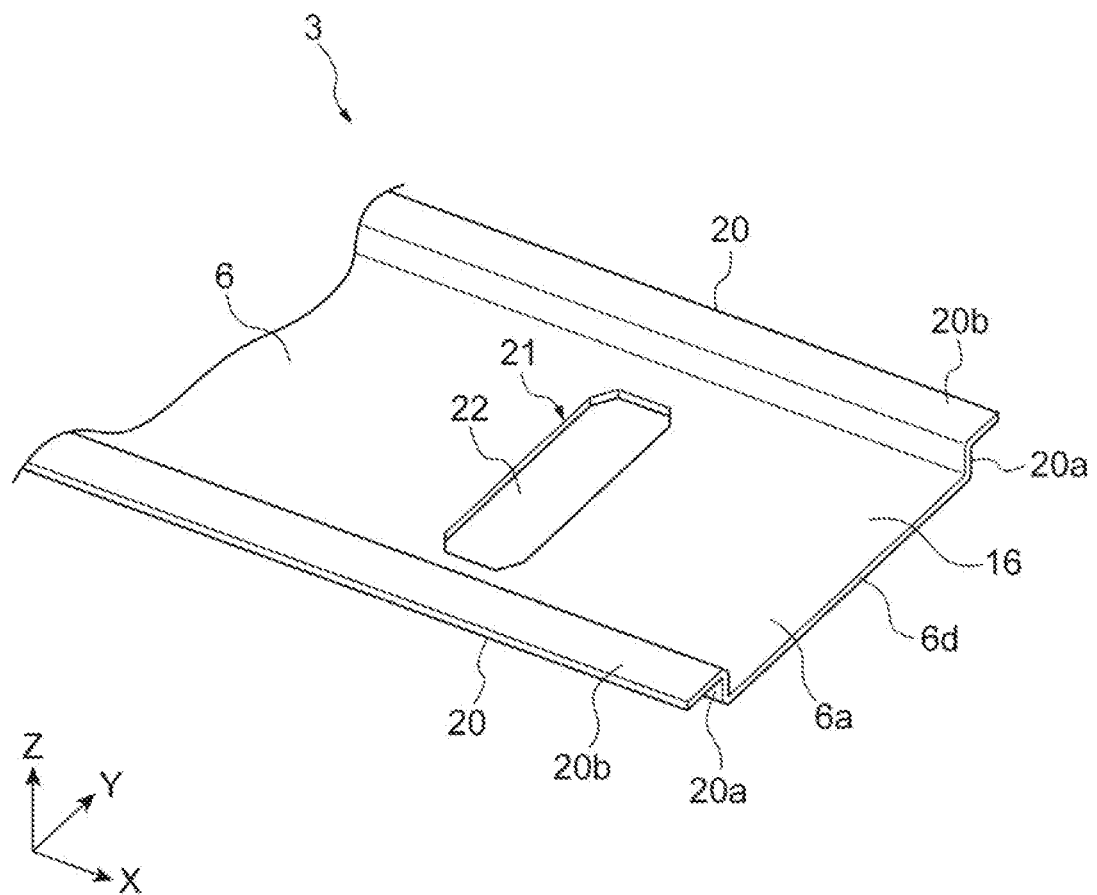
FIG. 4 is a schematic perspective view illustrating one modification example of a placement portion of a first bracket illustrated in FIG. 1.

FIG. 4 is a schematic perspective view illustrating one modification example of the placement portion 6 of the first bracket 3 illustrated in FIG. 1. In FIG. 4, flange portions 20 with an L-shaped cross section which extend in the forward and rearward direction (X direction) of the vehicle are respectively provided at both side edges of the placement portion 6 in the vehicle width direction (Y direction) in this modification example. The flange portion 20 includes a side wall 20a, and an overhanging wall 20b that overhangs outward from an upper end of the side wall 20a in the vehicle width direction.

A fragile portion 21 having a weaker strength than those of other regions of the placement portion 6 is provided in a base end portion of the cantilever region 16 of the placement portion 6. The fragile portion 21 includes a long hole 22 extending in the vehicle width direction. The long hole 22 is provided in the placement portion 6 between the flange portions 20 of the base end portion of the cantilever region 16.

In this modification example, since the fragile portion 21 is provided in the base end portion of the cantilever region 16, the cantilever region 16 is easily bent when an impact load is input to the console box 2 from above the vehicle. Therefore, the first bracket 3 and the second bracket 4 can be more smoothly deformed.

In this modification example, since the long hole 22 extending in the vehicle width direction is provided in the base end portion of the cantilever region 16, it is possible to easily form the fragile portion 21.

In this modification example, since the flange portions 20 with an L-shaped cross section which extend in the forward and rearward direction of the vehicle are respectively provided at both side edges of the placement portion 6 in the vehicle width direction, it is possible to secure the rigidity of the placement portion 6 even though the long hole 22 is provided in the placement portion 6.

In this modification example, the flange portions 20 with an L-shaped cross section are respectively provided at both side edges of the placement portion 6 in the vehicle width direction. However, the present disclosure is not specifically limited to this form, and similar to the foregoing embodiment, the protrusion walls 9 may be respectively provided at both side edges of the placement portion 6 in the vehicle width direction.

Figure 5:
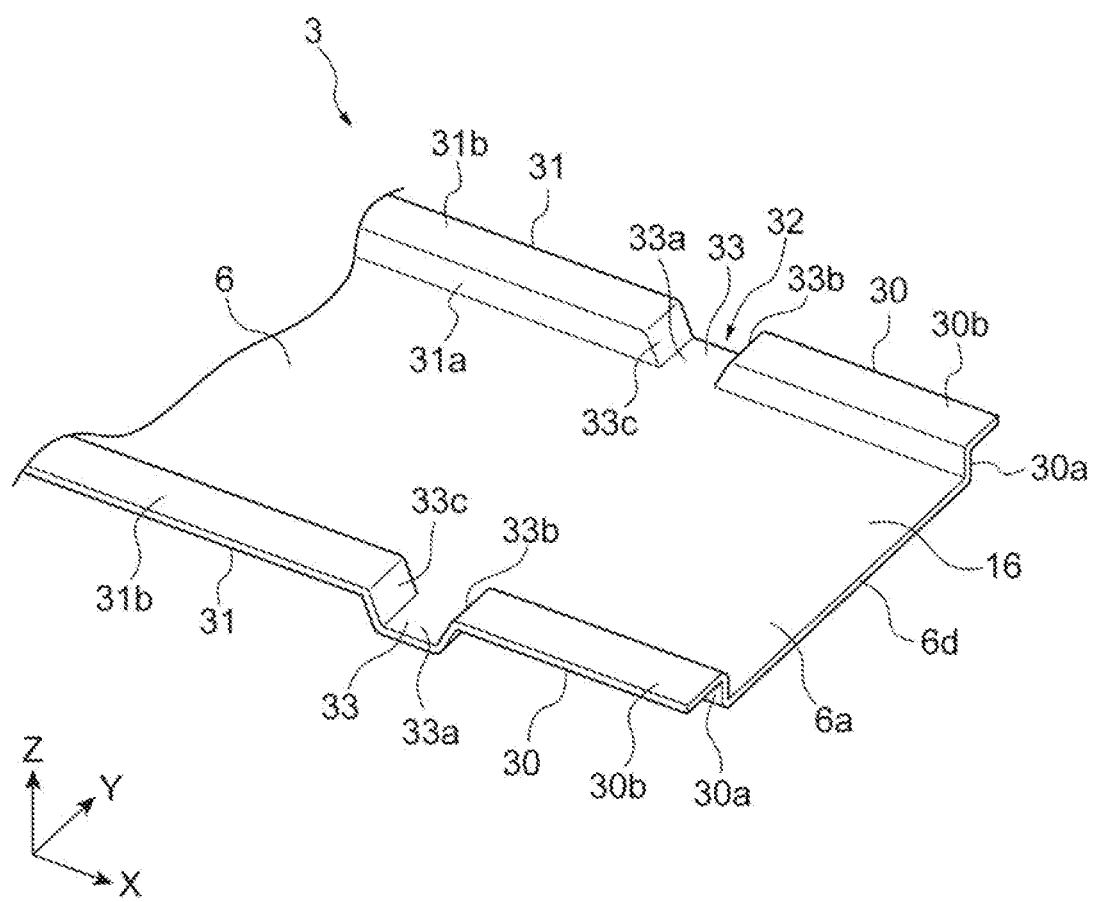
FIG. 5 is a schematic perspective view illustrating another modification example of the placement portion of the first bracket illustrated in FIG. 1.

FIG. 5 is a schematic perspective view illustrating another modification example of the placement portion 6 of the first bracket 3 illustrated in FIG. 1. In FIG. 5, first flange portions 30 with an L-shaped cross section and second flange portions 31 with an L-shaped cross section are respectively provided at both side edges of the placement portion 6 in the vehicle width direction in this modification example.

The first flange portion 30 extends from the rear end 6d of the placement portion 6 to the base end portion of the cantilever region 16 in the forward and rearward direction of the vehicle. The first flange portion 30 includes a side wall 30a, and an overhanging wall 30b that overhangs outward from an upper end of the side wall 30a in the vehicle width direction. The second flange portion 31 extends from the front end 6c (refer to FIG. 1) of the placement portion 6 to the base end portion of the cantilever region 16 in the forward and rearward direction of the vehicle. The second flange portion 31 includes a side wall 31a, and an overhanging wall 31b that overhangs outward from an upper end of the side wall 31a in the vehicle width direction.

A fragile portion 32 having a weaker strength than those of other regions of the placement portion 6 is provided in the base end portion of the cantilever region 16 of the placement portion 6. The fragile portion 32 includes recess portions 33 that are disposed between the first flange portions 30 and the second flange portions 31. The recess portions 33 are respectively provided at both side edges of the base end portion of the cantilever region 16.

The recess portion 33 includes a bottom wall 33a; an end wall 33b that connects the bottom wall 33a to the overhanging wall 30b of the first flange portion 30; and an end wall 33c that connects the bottom wall 33a to the overhanging wall 31b of the second flange portion 31. A bottom surface of the bottom wall 33a is flush with the upper surface 6a of the placement portion 6. The end walls 33b and 33c are disposed to face each other.

In this modification example, since the fragile portion 32 is provided in the base end portion of the cantilever region 16, the cantilever region 16 is easily bent when an impact load is input to the console box 2 from above the vehicle. Therefore, the first bracket 3 and the second bracket 4 can be more smoothly deformed.

In this modification example, since the recess portions 33 are disposed between the first flange portions 30 and the second flange portions 31, it is possible to form the fragile portion 32 while increasing the rigidity of the placement portion 6.

The present invention is not limited to the foregoing embodiment. For example, in the foregoing embodiment, the first bracket 3 includes the two front leg portions 7 and the second bracket 4 includes the two rear leg portions 12.

However, the number of the front leg portions 7 and the number of the rear leg portions 12 are not limited to two, and may be one.

The second bracket 4 may not include the rear leg portions 12. For example, the base portion 15 may include a mounting portion that is provided to bend rearward from the lower end 11*a* of the inclined portion 11.

In the foregoing embodiment, the second bracket 4 is disposed behind the first bracket 3. However, the present disclosure is not limited to this form. The second bracket 4 may be disposed in front of the first bracket 3.

What is claimed is:

1. A console support structure that is disposed in a central portion of a vehicle in a vehicle width direction to support a console box, the structure comprising:
    a first bracket including a placement portion on which the console box is placed; and
    a second bracket fixed to the first bracket,
    wherein the second bracket includes a joint portion joined to a lower surface of the placement portion, an inclined portion provided to obliquely bend downward from one end of front and rear ends of the joint portion, and a base portion provided to bend from a lower end of the inclined portion,
    a cantilever region which is supported on the joint portion in a cantilever manner is provided on one end side of the front and rear ends of the placement portion,
    a connection part between the joint portion and the inclined portion forms a first bend portion, and
    a connection part between the inclined portion and the base portion forms a second bend portion.

2. The console support structure according to claim 1,
    wherein the second bracket is disposed behind the first bracket,
    the inclined portion is provided to obliquely bend rearward and downward from a rear end of the joint portion, and
    the cantilever region is provided on a rear end side of the placement portion.

3. The console support structure according to claim 1,
    wherein a fragile portion having a weaker strength than those of other regions of the placement portion is provided in a base end portion of the cantilever region.

4. The console support structure according to claim 3,
    wherein the fragile portion includes a long hole extending in the vehicle width direction.

5. The console support structure according to claim 3,
    wherein a first flange portion with an L-shaped cross section which extends from a rear end of the placement portion in a forward and rearward direction of the vehicle and a second flange portion with an L-shaped cross section which extends from a front end of the placement portion in the forward and rearward direction of the vehicle are respectively provided at both side edges of the placement portion in the vehicle width direction, and
    the fragile portion includes a recess portion that is disposed between the first flange portion and the second flange portion.

6. The console support structure according to claim 1,
    wherein the first bracket includes a first leg portion that is provided to bend downward from the other end of the front and rear ends of the placement portion, and
    the base portion includes a second leg portion that is provided to bend downward from the lower end of the inclined portion.

7. The console support structure according to claim 6,
    wherein the first leg portion and the second leg portion are coupled to each other by a coupling member.

* * * * *